United States Patent
Chun et al.

(10) Patent No.: US 7,924,701 B2
(45) Date of Patent: Apr. 12, 2011

(54) DATA TRANSMITTING AND RECEIVING METHOD AND BROADCASTING RECEIVER

(75) Inventors: Won Ho Chun, Seoul (KR); Ku Bong Min, Seoul (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/155,138

(22) Filed: May 29, 2008

(65) Prior Publication Data

US 2009/0028048 A1 Jan. 29, 2009

(30) Foreign Application Priority Data

Jun. 11, 2007 (KR) .................. 10-2007-0056588
Jun. 11, 2007 (KR) .................. 10-2007-0056589

(51) Int. Cl.
*H04J 1/16* (2006.01)
(52) U.S. Cl. .............. 370/216; 725/25; 725/27; 725/31; 725/133; 725/141; 725/153
(58) Field of Classification Search .......... 370/229–230; 725/25, 27–31, 55, 133, 141, 153
See application file for complete search history.

(56) References Cited

U.S. PATENT DOCUMENTS

| | | | | |
|---|---|---|---|---|
| 6,901,049 B1 * | 5/2005 | Chapman | ...................... | 370/230 |
| 7,096,391 B2 * | 8/2006 | Johnson | ......................... | 714/48 |
| 7,308,619 B2 * | 12/2007 | Lee | ............... | 714/704 |
| 7,565,414 B1 * | 7/2009 | Love | .............. | 709/219 |
| 7,596,633 B2 * | 9/2009 | Mai et al. | ...................... | 709/249 |
| 2004/0008693 A1 * | 1/2004 | Grove et al. | ............. | 370/395.52 |
| 2004/0193736 A1 * | 9/2004 | Galloway | ......................... | 710/1 |
| 2005/0081080 A1 * | 4/2005 | Bender et al. | ..................... | 714/2 |
| 2006/0239456 A1 * | 10/2006 | Kim et al. | .................. | 380/201 |
| 2007/0106809 A1 * | 5/2007 | Cha et al. | ..................... | 709/230 |
| 2007/0110446 A1 * | 5/2007 | Hong et al. | ................... | 398/130 |
| 2008/0037420 A1 * | 2/2008 | Tang | ............................ | 370/229 |

* cited by examiner

*Primary Examiner* — William Trost, IV
*Assistant Examiner* — Ashil Farahmand
(74) *Attorney, Agent, or Firm* — McKenna Long & Aldridge LLP

(57) ABSTRACT

A data transmitting and receiving method and a broadcasting receiver are disclosed. A CABLECARD transmits a new flow request message for requesting a connection of a data transmitting and receiving path to a host. The host receiving the new flow request message transmits a new flow response message to the CABLECARD. The new flow request message includes a control field for recording processing information on an error generated during communication.

16 Claims, 13 Drawing Sheets

FIG. 2

| Syntax | No. of Bits | Mnemonic |
|---|---|---|
| New_flow_req() {  <br>   new_flow_req_tag  <br>   length_field()  <br>   service_type  <br>   if(service_type==00) {/*MPEG section*/  <br>      Reserved  <br>      PID  <br>   }  <br>   if(service_type==01) {/*IP unicast*/  <br>      MAC_address  <br>      option_field_length  <br>      for(i=0; I<option_field_length; i++) {  <br>         option_byte  <br>      }  <br>   }  <br>   if(service_type==02) {/*IP multicast*/  <br>      Reserved  <br>      multicast_group_ID  <br>   {  <br>   if(service_type==04) {/*Socket/  <br>      protocol_flag  <br>      timeout_control   ← 201  <br>      local_port_number  <br>      remote_port_number  <br>      remote_address_type  <br>      if(remote_address_type==0x00) {  <br>         name_length  <br>         for(int i=0; i<name_length;++i)  <br>         name_byte  <br>         if(remote_address_type==0x01)  <br>            ipv4_address  <br>         if(remote_address_type==0x02)  <br>            ipv6_address  <br>         connection_timeout  <br>   } | <br>24<br><br>8<br><br>3<br>13<br><br><br>48<br>8<br><br>8<br><br><br><br>4<br>28<br><br><br>8<br>8<br>16<br>16<br>8<br><br>8<br><br>8<br><br>32<br><br>128<br>8 | <br>uimsbf<br><br>uimsbf<br><br>bslbf<br>uimsbf<br><br><br>uimsbf<br>uimsbf<br><br>uimsbf<br><br><br><br>bslbf<br>uimsbf<br><br><br>uimsbf<br>uimsbf<br>uimsbf<br>uimsbf<br>uimsbf<br><br>uimsbf<br><br>uimsbf<br><br>uimsbf<br><br>uimsbf<br>uimsbf |

FIG. 3

| timeout_control_field_value | defines TCP timeout control unit |
|---|---|
| 0x00 | host control |
| 0x01 | cableCARD control |
| 0x03 ~ 0xFF | reserved |

FIG. 10

| Syntax | No. of Bits | Mnemonic |
|---|---|---|
| New_flow_req() { | | |
|    new_flow_req_tag | 24 | uimsbf |
|    length_field() | | |
|    service_type | 8 | uimsbf |
|    if(service_type==00) {/*MPEG section*/ | | |
|       Reserved | 3 | bslbf |
|       PID | 13 | uimsbf |
|    } | | |
|    if(service_type==01) {/*IP unicast*/ | | |
|       MAC_address | 48 | uimsbf |
|       option_field_length | 8 | uimsbf |
|       for(i=0; I<option_field_length; i++) { | | |
|          option_byte | 8 | uimsbf |
|       } | | |
|    } | | |
|    if(service_type==02) {/*IP multicast*/ | | |
|       Reserved | 4 | bslbf |
|       multicast_group_ID | 28 | uimsbf |
|    { | | |
|    if(service_type==04) {/*Socket/ | | |
|       protocol_flag | 8 | uimsbf |
|       icmp_control | 8 | uimsbf |
|       local_port_number | 16 | uimsbf |
|       remote_port_number | 16 | uimsbf |
|       remote_address_type | 8 | uimsbf |
|       if(remote_address_type==0x00) { | | |
|          name_length | 8 | uimsbf |
|          for(int i=0; i<name_length;++i) | | |
|          name_byte | 8 | uimsbf |
|          if(remote_address_type==0x01) | | |
|             ipv4_address | 32 | uimsbf |
|          if(remote_address_type==0x02) | | |
|             ipv6_address | 128 | uimsbf |
|          connection_timeout | 8 | uimsbf |
|    } | | |

1001 → icmp_control

FIG. 11

| icmp_control_field_value | defines ICMP control strategy |
|---|---|
| 0x00 | host ignores icmp message |
| 0x01 | host SHALL not ignore icmp message |
| 0x02 | host SHALL report icmp message |
| 0x03 ~ 0xFF | reserved |

DATA TRANSMITTING AND RECEIVING METHOD AND BROADCASTING RECEIVER

This application claims the benefit of Korean Patent Application No. 10-2007-0056589, filed on Jun. 11, 2007 and NO. 10-2007-0056588, filed on Jun. 11, 2007 which is hereby incorporated by reference as if fully set forth herein.

BACKGROUND OF THE INVENTION

1. Field of the Invention

The present invention relates to a method for transmitting and receiving data between a CABLECARD and a host and a broadcasting receiver.

2. Discussion of the Related Art

If an error occurs in a remote server or a middle router during data communication through a socket between a broadcasting receiver and the remote server, data transmitted by the broadcasting receiver may be lost or a data transmission error such as a data transmission delay may be generated.

When an error occurs, the broadcasting receiver may receive an error message from the remote server or the middle router. However, it is not definite which of a host and a CABLECARD is to process the error message received by the broadcasting receiver and how to process the received error message.

SUMMARY OF THE INVENTION

Accordingly, the present invention is directed to a data transmitting and receiving method and a broadcasting receiver that substantially obviate one or more problems due to limitations and disadvantages of the related art.

An object of the present invention is to provide a data transmitting and receiving method and a broadcasting receiver which definitely distinguish operations between a host and a CABLECARD by previously defining information on error processing method upon occurrence of an error during communication.

Another object of the present invention is to provide a data transmitting and receiving method and a broadcasting receiver which definitely distinguish data transmitting and receiving processing operations between a host and a CABLECARD by defining a subject of error control upon occurrence of a timeout error.

A further object of the present invention is to provide a data transmitting and receiving method and a broadcasting receiver which definitely distinguish data transmitting and receiving processing operations between a host and a CABLECARD by defining an error message processing method upon receipt of an error message.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data transmitting and receiving method includes: transmitting a new flow request message for requesting a connection of a data transmitting and receiving path by a CABLECARD to a host; and transmitting a new flow response message to the CABLECARD by the host receiving the new flow request message; wherein the new flow request message includes a control field for recording processing information on an error generated during communication.

The new flow request message may request a connection of a data transmitting and receiving path for transmission control protocol (TCP) communication. The processing information may be information on a control subject of a timeout generated by a packet transmission delay during the TCP communication. The control subject may be the host or the CABLECARD.

The new flow request message may request a connection of a transmitting and receiving path for user datagram protocol (UDP) communication. The processing information may be processing method information of an error message received due to occurrence of the error during the UDP communication. The processing method information may indicate that the host should ignore the error message or that the host should process the error message. The processing method information may indicate that the host should report the error message to the CABLECARD.

In another aspect of the present invention, a data transmitting and receiving method includes: receiving, by a host, a new flow request message which includes a timeout control field for recording control subject information on a subject of timeout control related to data transmission; receiving data from a CABLECARD by the host connected to the CABLECARD by a socket process; transmitting the data received from the CABLECARD to a remote server and generating a timeout when no response is received for a given time; and processing the timeout by the host when the control subject information indicates that the subject of the timeout control is the host. The data transmitting and receiving method may further include retransmitting the transmitted data by a given number of times by the host when the timeout occurs. The data transmitting and receiving method may further include: transmitting an error occurrence indication message of data to the CABLECARD by the host when the timeout is generated by a given number of times; stopping transmitting data to the host by the CABLECARD and transmitting a flow close request message to the host; and closing a socket process by the host. The error occurrence indication message may include a reason field for recording timeout occurrence information.

In still another aspect of the present invention, a data transmitting and receiving method includes: transmitting, by a CABLECARD, a new flow request message which includes a timeout control field for recording control subject information on a subject of timeout control related to data transmission; transmitting data to a host by the CABLECARD connected to the host by a socket process; generating a timeout when no response is received for a given time after transmitting the data; and processing the timeout by the CABLECARD when the control subject information indicates that the subject of timeout control is the CABLECARD.

The timeout may be generated when a response message to the transmitted data is not received for a given time after the CABLECARD transmits data to the host. The data transmitting and receiving method may further include: stopping transmitting data to the host by the CABLECARD when the timeout is generated and transmitting a flow close request message to the host; and closing a socket process by the host.

In another aspect of the present invention, a data transmitting and receiving method includes: receiving, by a host, a new flow request message including an error message control field for recording processing method information of an error message received during UDP communication; receiving data from a CABLECARD by the host connected to the CABLECARD by a socket process; transmitting the data received from the CABLECARD to a remote server and receiving an error message for the transmitted data; and processing the received error message by the host according to the information recorded in the error message control field.

The host may ignore the received error message when the processing method information indicates that the received error message should be ignored.

The data transmitting and receiving method may further include: transmitting an error occurrence indication message by the host to the CABLECARD when the processing method information indicates that the received error message should be processed; stopping transmitting data to the host by the CABLECARD and transmitting a flow close request message to the host; and closing a socket process by the host. The error occurrence indication message may include a reason field for recording reception information of the error message.

The data transmitting and receiving method may further include; reporting error occurrence of data to the CABLECARD by the host when the processing method information indicates that the received error message should be reported to the CABLECARD; and determining whether to transmit data by the CABLECARD and informing the host of a determined result.

In still another aspect of the present invention, a broadcasting receiver includes: a CABLECARD which is a communication path with a broadcasting signal transmitter; a cable communication unit performing network communication by connecting the broadcasting receiver to a remote server; and a host which receives data from the CABLECARD and transmits and receives data with the remote server through the cable communication unit; wherein the CABLECARD and the host are connected by a new flow request message including a control field for recording processing information on an error generated during communication, and the host or the CABLECARD processes the error according to the processing information recorded in the control field.

The new flow request message may request a connection of a data transmitting and receiving path for TCP communication. The processing information may be information on a control subject of a timeout generated by a packet transmission delay during the TCP communication. The control subject may be the host or the CABLECARD. The new flow request message may request a connection of a data transmitting and receiving path for UDP communication.

The processing information may be information on an error message processing method received by the error occurrence during UDP communication. The processing method information may be information indicating that the host should ignore the error message or that the host should process the error message. The processing method information may indicate that the host should report the error message to the CABLECARD.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a syntax of a new flow request message including a timeout control field according to the present invention;

FIG. 3 illustrates an exemplary embodiment of the timeout control field shown in FIG. 2;

FIG. 10 illustrates a syntax of a new flow request message including an error message control field according to the present invention;

FIG. 11 illustrates an exemplary embodiment of the error message control field shown in FIG. 10;

DETAILED DESCRIPTION OF THE INVENTION

Figure 1:
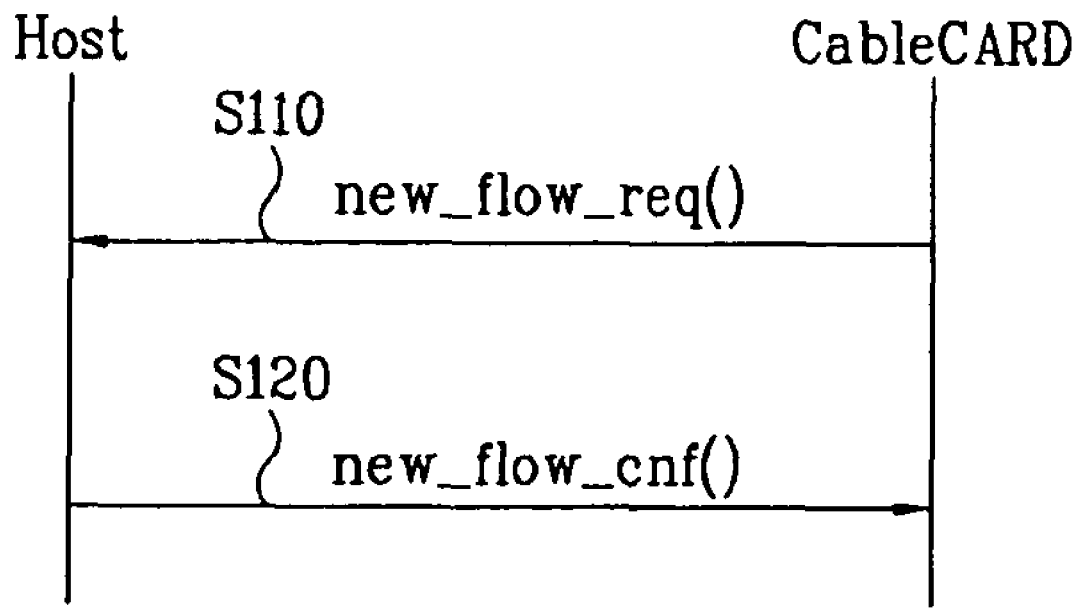
FIG. 1 illustrates a data transmitting and receiving flow between a host and a CABLECARD according to the present invention.

Reference will now be made in detail to the preferred embodiments of the present invention, examples of which are illustrated in the accompanying drawings.

Although most terms used in the present invention have been selected from general ones widely used in the art, some terms have been arbitrarily selected by the applicant and their meanings are explained in detail in the following description as needed. Thus, the present invention should be understood with the intended meanings of the terms rather than their simple names or meanings.

A broadcasting receiver includes a CABLECARD, a host, and a cable communication unit.

The CABLECARD is a communication path between a broadcasting signal transmitter (for example, a broadcasting station), a head-end, and a host. The cable communication unit connects the broadcasting receiver to a remote server to perform network communication. There is a cable modem as an example of the cable communication unit.

The host processes a received broadcasting signal and may output the broadcasting signal. Further, the host receives data from the CABLECARD and communicates with the remote server through the cable communication unit, thereby transmitting and receiving data.

Three Internet protocol (IP) addresses are required to establish IP communication between the host, the CABLECARD, and the remote server. The first IP address is for the cable modem, and the second and third IP addresses are for the host and the cable card, respectively. Basically, an open cable application platform (OCAP) carries out IP communication by opening a socket using an IP address of the host. If the CABLECARD desires to perform IP communication, the IP communication is performed through a CABLECARD interface by using an IP address for the CABLECARD. The CABLECARD transmits data in IP packet form to the host through the interface between the host and the CABLECARD. Since the host should transmit and receive data with a card identifier, its configuration becomes complicated. Moreover, since three IP addresses are needed within a single broadcasting receiver, the IP addresses are wasted.

According to the present invention, the IP address of the CABLECARD and IP communication is performed through the socket by using the IP address of the host, thereby reducing waste of the IP addresses and simply achieving IP communication of a communication card.

The remote server and the broadcasting receiver perform logical communication. In this case, a transport layer carrying out end-to-end logical communication includes user datagram protocol (UDP) and transmission control protocol (TCP).

The TCP is a connection-oriented transport and transmits data in consideration of an external server state. That is, the TCP receives a response message to transmitted data to confirm that data is normally transmitted, and re-transmits data when data is not normally received.

During TCP communication, connection may be cut by an error in the host, the remote server, or a middle router for connecting the host and the remote server to each other. If a timeout error occurs indicating that data is not received from the remote server for a long time after transmitting data, an error processing method is not definite between the CABLECARD and the host.

The UDP is a connectionless transport and transmits data without considering a state of the remote server. Therefore, data transmission is not delayed.

In UDP communication through the socket, an error may occur in the host, the remote server, or the middle router connecting the host and the remote server to each other. Then a transmitted UDP packet may not reach the remote host. Since the UDP protocol provides a best-effort service, it can not ensure reliability. Therefore, it is not guaranteed whether a datagram transmitted by an IP layer arrives at a destination. If the remote server has an error, the remote server may report an error through an error message to a transmitting side. When the error message is received, the transmitting side processes the error message. That is, the transmitting side may process a procedure corresponding to the error message or may ignore the error message. Although such processing methods of the transmitting side may be achieved in various forms, there is no standard for the processing methods and thus operation establishment becomes obscure. Even during a test, arbitrary standard is applied.

FIG. 1 illustrates a data transmitting and receiving flow between a host and a CABLECARD according to the present invention.

Referring to FIG. 1, a CABLECARD transmits a new flow request message new_flow_req( ) to a host, and the host transmits a new flow response message new_flow_cnf( ) to the CABLECARD, so that the CABLECARD and the host are connected to each other for data transmission and reception.

The new flow request message new_flow_req( ) includes a control field which defines a processing method for an error message received during UDP communication or a control subject of a timeout generated by a packet transmission delay during the TCP communication.

The present invention provides a method for processing an error generated during transport layer communication. For example, the error processing method is to control a timeout error circumstance under which a response message to data transmitted during TCP transport layer communication is not received. Another example of the error processing method is to control an error message by a host when an error is generated during UDP transport layer communication and an error message is received from a remote server.

The remote server and a broadcasting receiver communicate with each other through a TCP or UDP transport layer. The remote server communicates with a CABLECARD through a host within the broadcasting receiver.

To transmit and receive data with the remote server, the host and the CABLECARD are connected to each other by a socket process. The CABLECARD transmits the new flow request message to the host and the host transmits the new flow response message for the new flow request message to the CABLECARD, thereby starting a connection between the CABLECARD and the host.

If the CABLECARD and the host are connected to each other, the CABLECARD transmits data to the host and the host transmits the received data to the remote server through a cable modem.

In the TCP protocol, since an acknowledgement signal which is a response message to data transmitted by the host to the remote server is always received, reliability is guaranteed. However, if the remote server is down during data transmission or if an abnormal circumstance, such as an error in a router connecting a middle path, occurs, a transmitted data packet or a response message to the transmitted data packet may be lost. The host operates a timer after transmitting data, and re-transmits the data when no response message is received for a given time. If the response message is not received even though data is transmitted several times, the host gives up data transmission. If a timeout error occurs representing that a response message to transmitted data is not received for a predetermined time, a timeout control field defining an error processing method by the host or the CABLECARD is added to the new flow request message.

FIG. 2 illustrates a syntax of a new flow request message including a timeout control field according to the present invention.

Referring to FIG. 2, the new flow request message includes a timeout control field 201 for recording processing information defining an error processing method by the host or the CABLECARD when a timeout error occurs. In this case, the timeout error is generated in the case where no response message to transmitted data is received for a given time in a loop containing socket connection information ("a socket connection information loop") when a service type is a socket process.

The new flow request message is transmitted to the card by the host in an out-of-band (OOB) mode and transmitted to the host by the CABLECARD in a DOCSIS set-top gateway (DSG) mode.

The new flow request message is a message for requesting a connection or flow between the host and the CABLECARD. The new flow request message includes connection information according to a used process in an additional loop.

A common loop includes new flow request message tag, field length, and service type fields. The service type includes MPEG section, IP unicast, IP multicast, socket, etc. and one of these types is defined in the service type field.

An individual loop includes connection information according to the service type. The timeout control field according to the present invention corresponds to one of socket connection information and is included in the socket connection information loop.

The socket connection information loop includes a protocol tag (protocol_tag) field, a timeout control (timeout_control) field, a local port number (local_port_number) field, a remote port number (remote_port_number) field, and a connection timeout (connection_timeout) field. The socket connection information loop may additionally include a socket connection information field.

Processing information recorded in the timeout control field 201 may be information on a subject of control of the timeout error. The subject of control of the timeout error may be the host or CABLECARD. A process after the timeout error occurs may be different according to the processing information recorded in the timeout control field. That is, a process after the timeout error occurs varies according to the subject of the control defined by the processing information recorded in the timeout control field.

The local port number (local_port_number) field identifies a local port.

The remote port number (remote_port_number) field identifies a remote port.

The connection timeout (connection_timeout) field defines a timeout state. For example, the connection timeout field defines a time period judged to be a timeout.

FIG. 3 illustrates an exemplary embodiment of the timeout control field shown in FIG. 2.

Referring to FIG. 3, if a timeout control field value is 0x00, the host is the subject of control of the timeout error, and if the timeout control field value is 0x01, the CABLECARD is the subject of control of the timeout error. However, the opposite case is also possible. Remaining bits may be saved as a reserved field for future use.

The timeout control field may be constructed to designate the CABLECARD or the host as the subject of control only by values of 0 and 1 or save remaining bits as a reserved field for future use.

Figure 4:
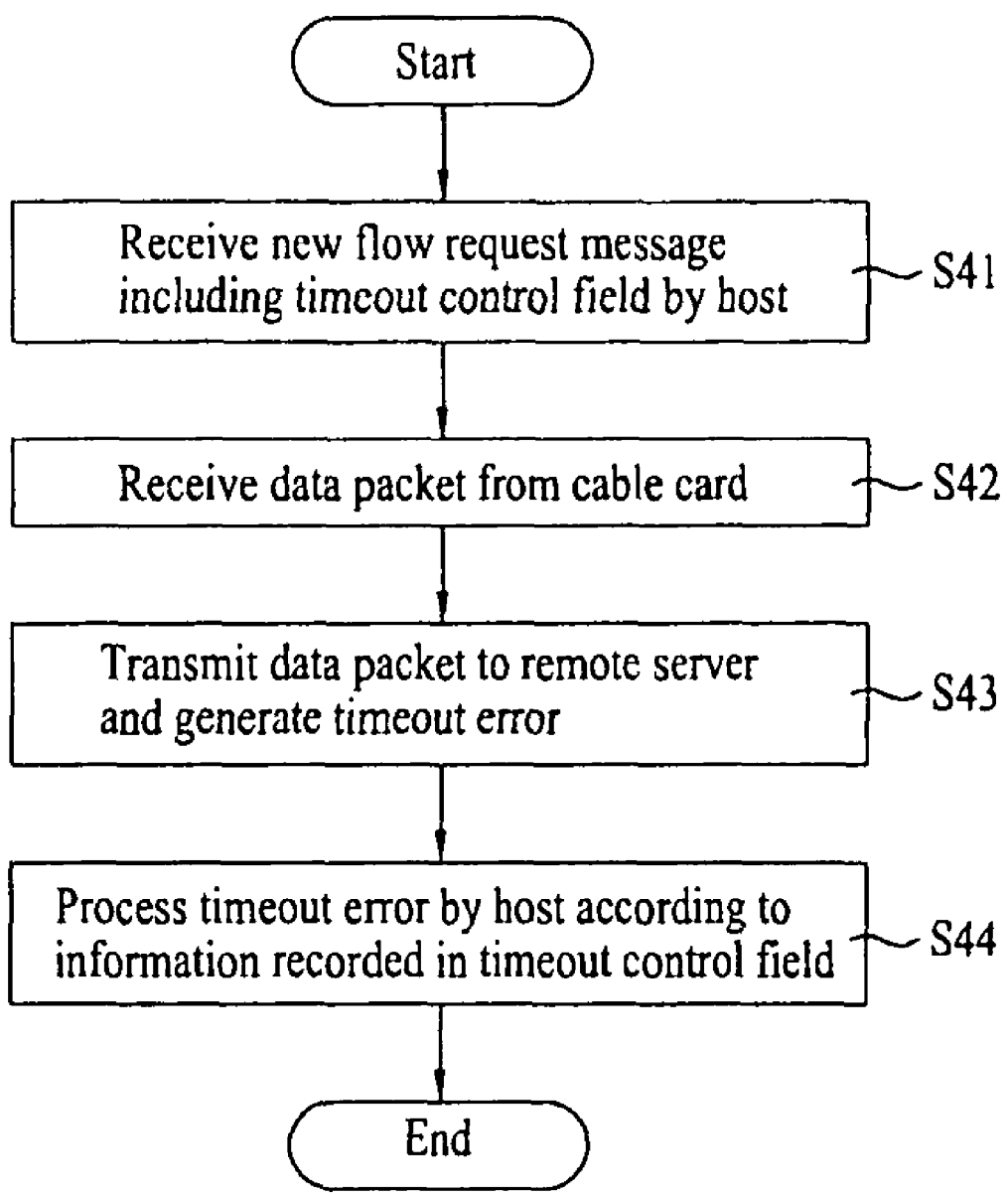
FIG. 4 is a flow chart illustrating an exemplary embodiment of a data transmitting and receiving method according to the present invention.

FIG. 4 is a flow chart illustrating an exemplary embodiment of a data transmitting and receiving method according to the present invention.

Referring to FIG. 4, the data transmitting and receiving method includes receiving, by a host, a new flow request message new_flow_req( ) which includes a timeout control field for recording control subject information on a subject of control of a timeout error related to data transmission (S41), receiving data from a CABLECARD by the host connected to the CABLECARD by a socket process (S42), transmitting the data received from the CABLECARD to a remote server and generating a timeout error when no response is received for a given time (S43), and processing the timeout error by the host when the control subject information designates the host as the subject of control of the timeout control (S44).

In step S41, the host receives the new flow request message from the CABLECARD. The new flow request message includes the timeout control field defining the subject of control of the timeout error related to packet transmission.

The host receiving the new flow request message transmits a new flow response message to the CABLECARD. When the CABLECARD receives the new flow response message, a data path is connected between the host and the CABLECARD.

If the data path is connected, the host receives data from the CABLECARD through an extended channel (S42). The data may be received in packet form. The data received by the host is inputted onto a network via a cable modem through an opened socket. Basically, since the host provides the socket, it may be easy for the host to process a communication error for a data packet outputted through the socket in TCP communication by the host in TCP communication.

A TCP/IP stack of the host sets a retransmission time while transmitting the data packet to the remote server and waits for a response message.

If the host does not receive the response message from the remote server within a timeout time, the host attempts to retransmit the data packet.

If the response message is not received even though the data packet is transmitted several times, that is, if a timeout error occurs, a control subject designated by the control subject information recorded in the timeout control field controls the timeout error (S44). The timeout control field is included in the new flow request message. If the control subject information designates the host, the host controls the next procedure.

Figure 5:
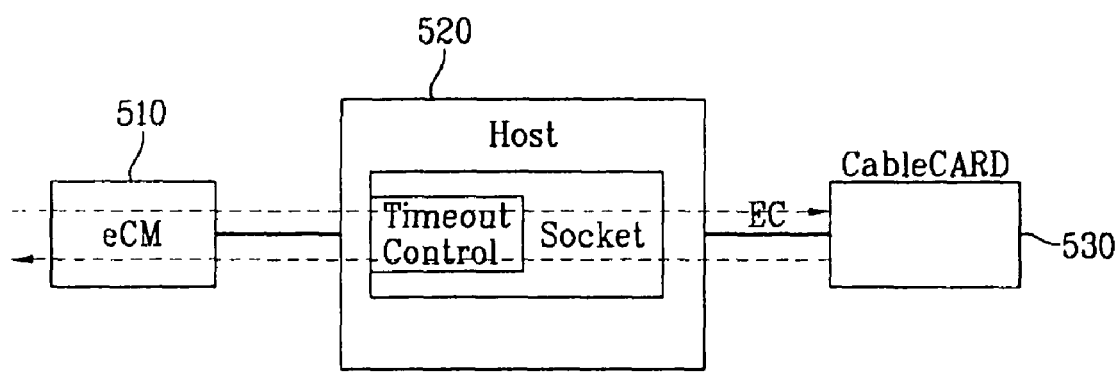
FIG. 5 is a diagram illustrating that a subject of timeout control is a host according to the present invention.

FIG. 5 is a diagram illustrating that a subject of timeout control is a host according to the present invention.

Referring to FIG. 5, in a broadcasting receiver including a cable modem 510, a host 520, and a CABLECARD 530, the host 520 is a subject of timeout control.

Figure 6:
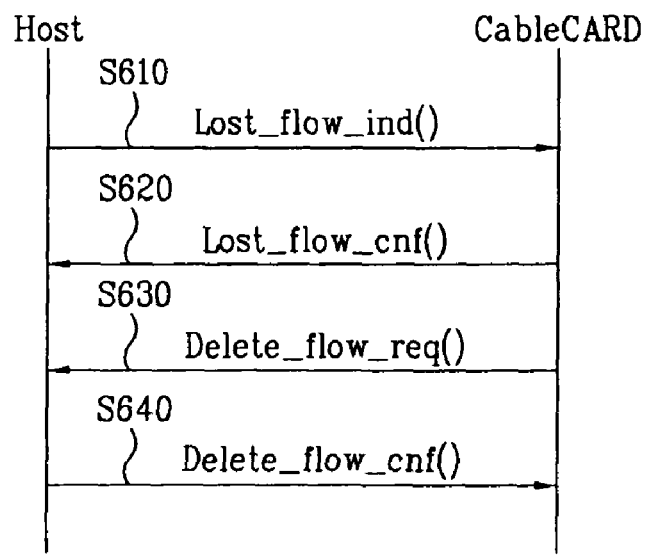
FIG. 6 illustrates a timeout error control flow when a host is a subject of timeout control according to the present invention.

FIG. 6 illustrates a timeout error control flow when a host is a subject of timeout control according to the present invention.

When the control subject information recorded in the timeout control field represents that a subject of control is the host, the host stops transmitting a data packet and the TCP/IP stack transmits the timeout error to an application of the host through a socket interface.

The corresponding application transmits an error occurrence indication message lost_flow_ind( ) to the CABLECARD to inform the CABLECARD that a flow has been disconnected (S610). Timeout occurrence information is recorded in a reason field of the error occurrence designating message. For example, if a value of the reason field of the error occurrence designating message is 0x06, it may mean a socket write error. The error occurrence indication message may inform the CABLECARD of an error occurrence flow by using a flow identifier.

The CABLECARD transmits an error occurrence response message lost_flow_cnf( ) to the host (S620) and transmits a flow close request message delete_flow_req( ) to the host (S630). Upon receipt of the flow close request message delete_flow_req( ) from the cable card, the host closes a socket for the corresponding flow and transmits a flow close response message delete_flow_cnf( ) to the CABLECARD (S640).

Next, the CABLECARD transmits a new flow request message to the host. If a new data path is connected, data can be newly transmitted and received.

Figure 7:
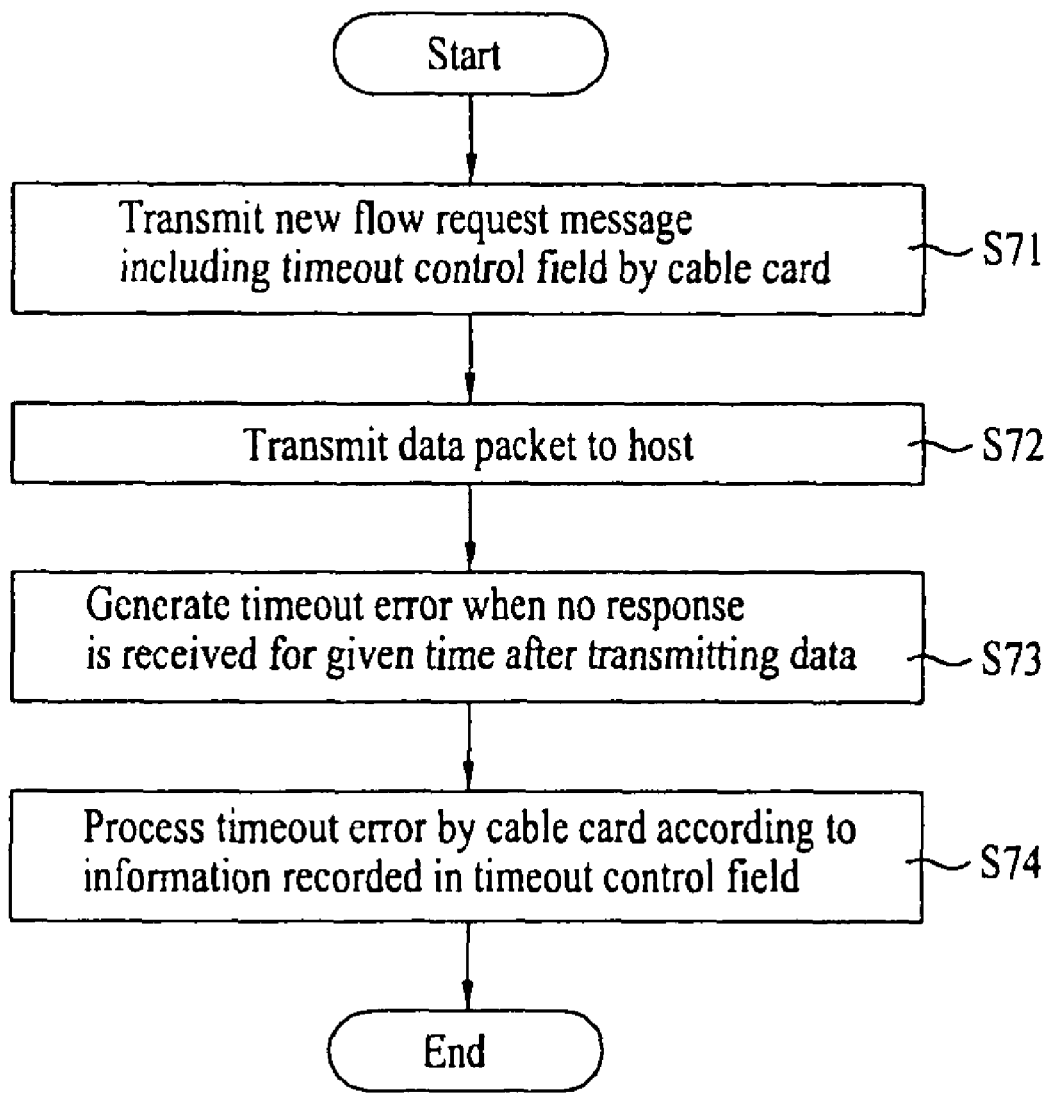
FIG. 7 is a flow chart illustrating another exemplary embodiment of a data transmitting and receiving method according to the present invention.

FIG. 7 is a flow chart illustrating another exemplary embodiment of a data transmitting and receiving method according to the present invention.

Referring to FIG. 7, the data transmitting and receiving method includes transmitting, by a CABLECARD, a new flow request message new_flow_req( ) which includes a timeout control field for recording control subject information on a subject of timeout control related to data transmission (S71), transmitting data to a host by the CABLECARD connected to the host by a socket process (S72), generating a timeout error when no response is received for a given time after transmitting the data (S73), and processing the timeout error by the CABLECARD when the control subject information designates the CABLECARD as the subject of the timeout control (S74).

In step S71, the CABLECARD requests the host to open a new flow. The new flow request message includes the timeout control field for recording the control subject information on the subject of the timeout control related to packet transmission.

The host receiving the new flow request message transmits a new flow response message to the CABLECARD. When the CABLECARD receives the new flow response message, a data path is connected between the host and the CABLECARD.

If the data path is connected, the CABLECARD transmits data to the host through an extended channel (S72). In this case, the data may be transmitted in packet form.

After transmitting the data, the CABLECARD sets a timer for receiving a response message from a remote server. A sufficient time should be ensured from transmitting data packet to receiving the response message from the remote server.

If no response message is received within a timeout time, the CABLECARD determines that a timeout error occurs (S73).

If the timeout error occurs, a control subject designated by the control subject information recorded in the timeout control field controls the timeout error (S74). If the control subject information designates the CABLECARD as the control subject, the CABLECARD controls the next procedure.

Figure 8:
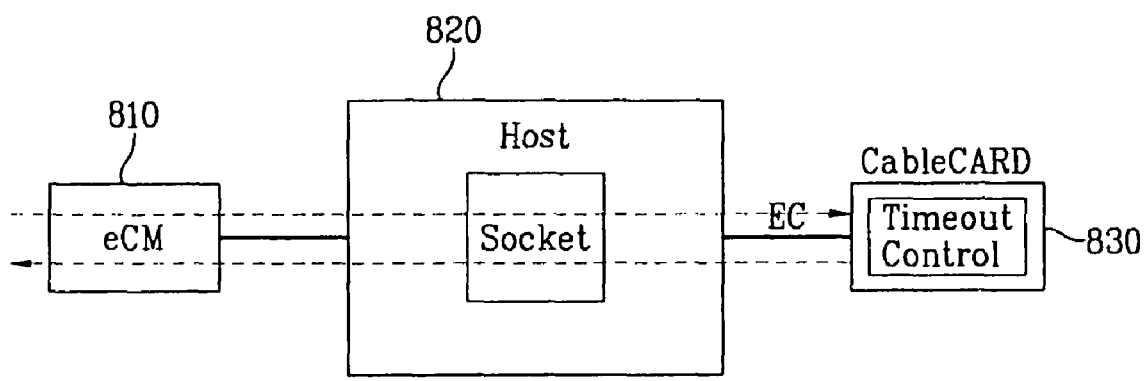
FIG. 8 is a diagram illustrating that a subject of timeout control is a CABLECARD.

FIG. 8 is a diagram illustrating that a subject of timeout control is a CABLECARD.

Referring to FIG. 8, in a broadcasting receiver including a cable modem 810, a host 820, and a CABLECARD 830, the CABLECARD 830 is the subject of the timeout control.

Figure 9:
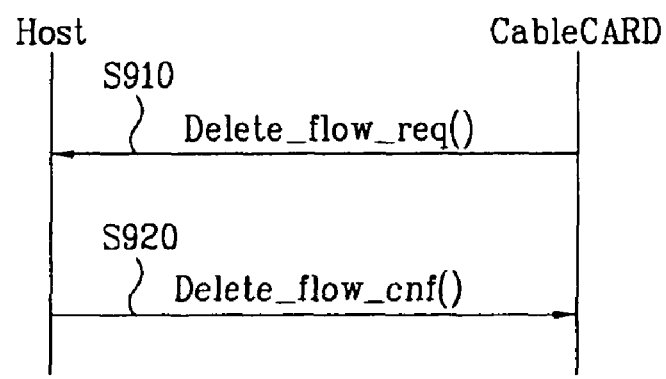
FIG. 9 illustrates a timeout error control flow when a CABLECARD is a subject of timeout control according to the present invention.

FIG. 9 illustrates a timeout error control flow when a CABLECARD is a subject of timeout control according to the present invention.

When the control subject information recorded in the timeout control field designates the CABLECARD as the control subject, the CABLECARD stops transmitting data and transmits a flow close message delete_flow_req( ) to the host (S910). The flow close message may indicate close of a corresponding flow by using a flow identifier.

Upon receipt of the flow close request message delete_flow_req( ) from the CABLECARD, the host closes a flow for the corresponding flow identifier, closes a socket for the corresponding flow, and transmits a flow close response message delete_flow_cnf( ) to the CABLECARD (S910).

Next, the CABLECARD transmits a new flow request message to the host. If a new data path is connected, data can be newly transmitted and received.

The CABLECARD transmits a new flow request message new_flow_req( ) to the host to open a new flow. If the CABLECARD is the subject of control for the timeout error, the host ignores processing for the case where an acknowledgement message for the transmitted data packet is not received and may attempt re-transmitting data.

Basically, since the UDP protocol does not provide reliability, the host transmitting a datagram does not guarantee that the datagram transmitted by the host arrives at a destination. However, if an error occurs in the remote server or during data transmission, the remote server may transmit an error message to a transmitting side. As an example of the error message, there is an Internet control message protocol (ICMP) message. Hereinafter, the ICMP message is described as the error message by way of example.

Since the transmitting side does not care whether the already transmitted datagram arrives at the destination, the transmitting side may ignore a received ICMP message. Alternatively, upon receipt of the ICMP message, the transmitting side may perform appropriate processing. This depends on how the host is constructed. However, since there is no definite technology for a construction method, the configuration of the host may differ according to models of each company. Therefore, it is necessary to prevent errors by providing methods capable of definitely regulating obscure parts.

FIG. 10 illustrates a syntax of a new flow request message including an error message control field according to the present invention.

Referring to FIG. 10, the new flow request message includes an error message control field 1001 for recording processing method information of an error message received during UDP communication in a socket connection information loop when a service type is a socket process.

The new flow request message is transmitted to the cable card by the host in an OOB mode and transmitted to the host by the CABLECARD in a DSG mode.

The new flow request message is a message for requesting that a connection or flow between the host and the card be opened. The new flow request message includes connection information according to a used process in an additional loop.

A common loop includes new flow request message tag, field length, and service type fields. The service type includes MPEG section, IP unicast, IP multicast, socket, etc. and one of these types is defined in the service type field.

An individual loop includes connection information according to the service type. Since the error message control field according to the present invention corresponds to one of socket connection information, it is included in the socket connection information loop.

The socket connection information loop includes a protocol tag (protocol_tag) field, a timeout control (timeout_control) field, a local port number (local_port_number) field, a remote port number (remote_port_number) field, and a connection timeout (connection_timeout) field. The socket connection information loop may additionally include a socket connection information field.

The error message control field 1001 records processing method information on an error message processing method when an error message is received from the remote server. The processing method information recorded in the error message control field may indicate that the error message is ignored or that the error message is not ignored. Error message processing varies according to the processing method information recorded in the error message control field.

The processing method information recorded in the error message control field 1001 may indicate that a received error message is reported to the CABLECARD.

The local port number (local_port_number) field identifies a local port.

The remote port number (remote_port_number) field identifies a remote port.

The connection timeout (connection_timeout) field defines a timeout state. For example, the connection timeout field defines a time period judged to be timeout.

FIG. 11 illustrates an exemplary embodiment of the error message control field shown in FIG. 10.

Referring to FIG. 11, if an error message control field value is 0x00, a host ignores a received error message; if the value is 0x01, the host does not ignore the error message; and if the value is 0x02, the host reports the error message to a CABLE-CARD. The above-described control methods according to the field values may be differently achieved.

Redundant bits may be saved as a reserved field for future use.

When the CABLECARD transmits a new flow request message new_flow_req( ) to the host, the CABLECARD sets the error message control field icmp_control to 0x00 (host ignores ICMP message), 0x01 (host shall not ignore ICMP message), or 0x02 (host shall report ICMP message). However, it should be noted that these examples are illustrative not restrictive.

The host receiving the new flow request message new_flow_req( ) extracts an error message control field value icmp_control_field_value to determine whether to process or disregard the ICMP error message and performs an operation according to the determined result.

If the error message control field value within the new flow request message new_flow_req( ) is not defined values, the host may process the error message as default.

Figure 12:
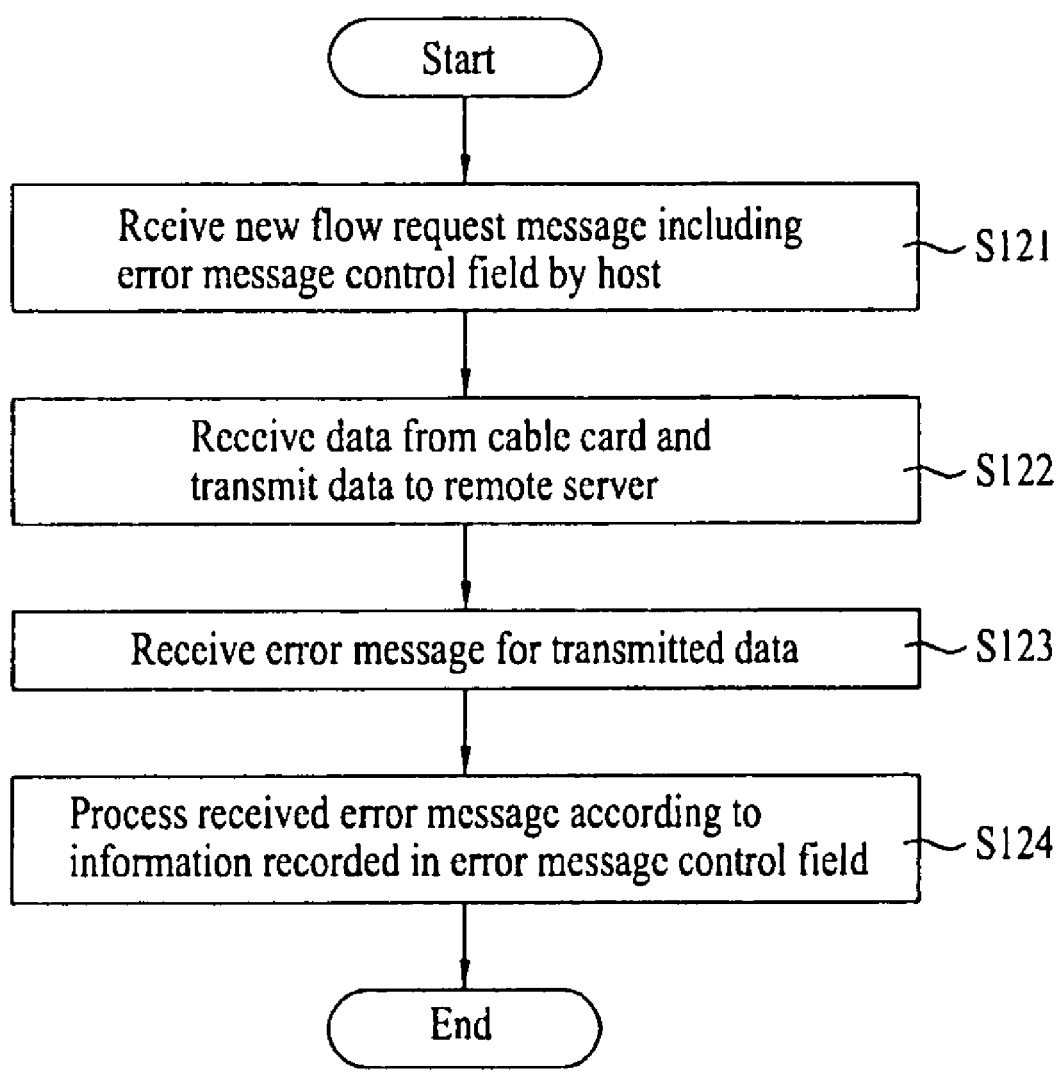
FIG. 12 is a flow chart illustrating another exemplary embodiment of a data transmitting and receiving method according to the present invention.

FIG. 12 is a flow chart illustrating another exemplary embodiment of a data transmitting and receiving method according to the present invention.

Referring to FIG. 12, the data transmitting and receiving method includes receiving, by a host, a new flow request message new_flow_req( ) which includes an error message control field for recording processing method information of an error message received during UDP communication (S121), receiving data from a CABLECARD by the host connected to the CABLECARD by a socket process and transmitting the data received from the CABLECARD to a remote server (S122), and receiving an error message for the transmitted data (S123), and processing the received error message by the host according to the information recorded in the error message control field (S124).

In step 121, the host receives the new flow request message from the CABLECARD. The new flow request message includes the error message control field for recording the processing method information of the error message received during UDP communication.

The host receiving the new flow request message transmits a new flow response message to the CABLECARD. When the CABLECARD receives the new flow response message, a data path is connected between the host and the CABLE-CARD.

If the data path is connected, the host receives data from the CABLECARD through an extended channel and transmits the data to the remote server (S122). In this case, the data may be received in packet or datagram form. The data received by the host outputs onto a network via a cable mode through an opened socket.

If an error occurs in the remote server or a middle router, an error message is transmitted to a data transmitting side. The host receives the error message (S123).

The host processes the error message according to the processing method information recorded in the error message control field contained in the new flow request message (S124).

Figure 13:
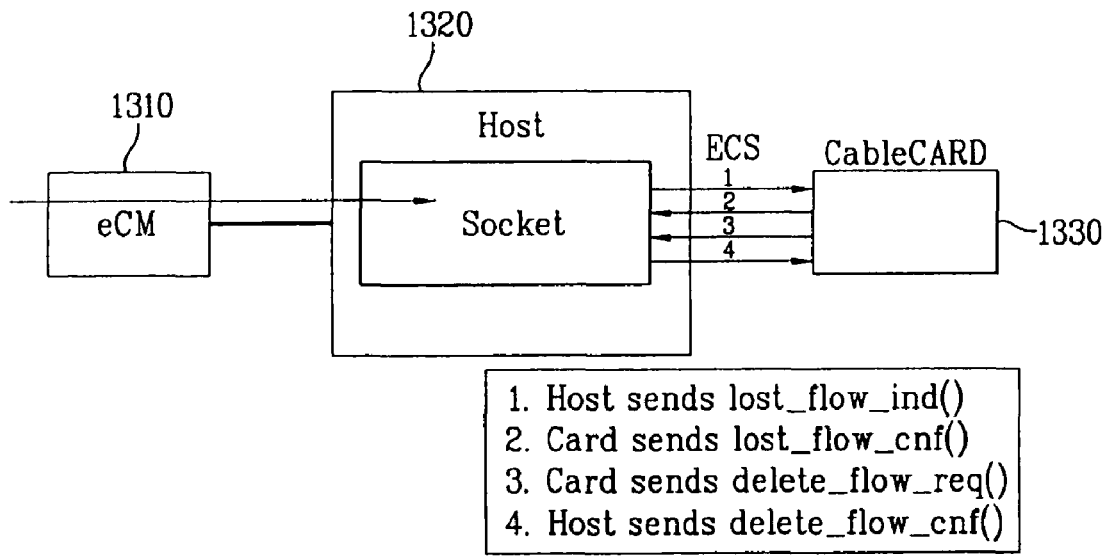
FIG. 13 illustrates a characteristic of processing an error message received by a host according to the present invention.

FIG. 13 illustrates a characteristic of processing an error message received by a host according to the present invention.

Referring to FIG. 13, in a broadcasting receiver including a cable modem 1310, a host 1320, and a CABLECARD 1330, if the host 1320 receives an error message through the cable modem 1310, the host 1320 copes with error occurrence circumstances. A detailed method of processing error occurrence will now be described with reference to FIG. 14.

Figure 14:
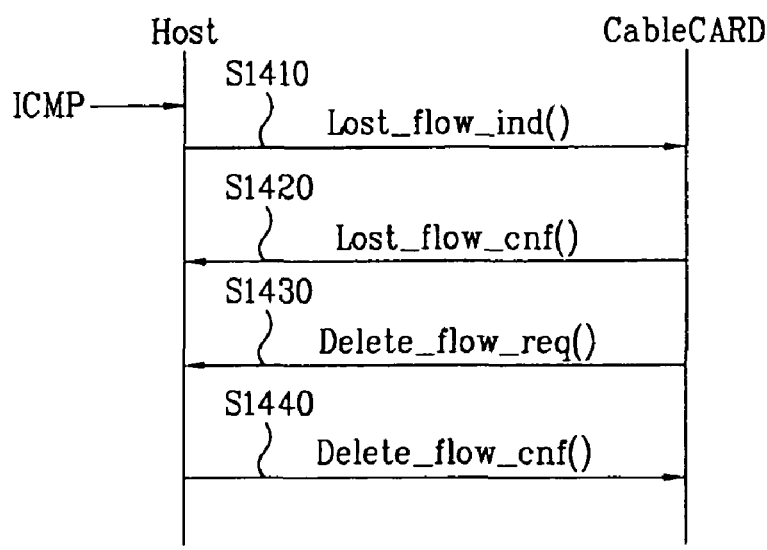
FIG. 14 illustrates an error message processing method in response to an error message received by a host according to the present invention.

FIG. 14 illustrates an error processing method in response to an error message received by a host.

If the processing method information recorded in the error message control field indicates that the host should not ignore the received error message, the host can confirm whether a port of a corresponding server is ready for receiving data by confirming the state of the remote server when a UDP socket is requested to be opened. If an error message (ICMP message) is received representing that there is an error in UDP packet transmission due to an error in the remote server or the middle router after transmitting UDP datagram, the host stops transmitting data and transmits error occurrence to an application of the host through a socket interface.

The corresponding application transmits an error occurrence indication message lost_flow_ind( ) to the CABLE-CARD (S1410) to inform the CABLECARD that a flow is disconnected. Error occurrence information may be recorded in a reason field reason_field of the error occurrence indication message. For example, if a reason field value of the error occurrence indication message is 0x06, it may represent that a socket write error occurs. The error occurrence indication message may inform the CABLECARD of an error occurrence flow by using a flow identifier.

The CABLECARD transmits an error occurrence response message lost_flow_cnf( ) to the host (S1420), and transmits a flow close request message delete_flow_req( ) to the host (S1430). When receiving the flow close request message delete_flow_req( ) from the CABLECARD, the host closes a socket for a corresponding flow and transmits a flow close response message delete_flow_cnf( ) to the CABLECARD (S1440).

Next, the CABLECARD transmits a new flow request message to the host. If a new data path is connected, data can be newly transmitted and received.

If information designating that the error message received by the host should be reported to the CABLECARD, the host can confirm whether a port of a corresponding server is ready for receiving data by confirming the state of the remote server when there is a UDP socket open request. If an error message (ICMP message) is received representing that there is an error in UDP packet transmission due to an error in the remote server or the middle router after transmitting UDP datagram, the host transmits a warning message to the CABLECARD and continues to transmit UDP packet. The warning message may use an existing error occurrence indication message lost_flow_ind( ) function and may use a newly defined function, for example, a problem_flow_ind( ) function. In this case, the CABLECARD determines whether to ignore the error message or to close a socket connection and performs the next procedure. That is, the error message is reported to the CABLECARD and the CABLECARD determines an error message processing method.

Figure 15:
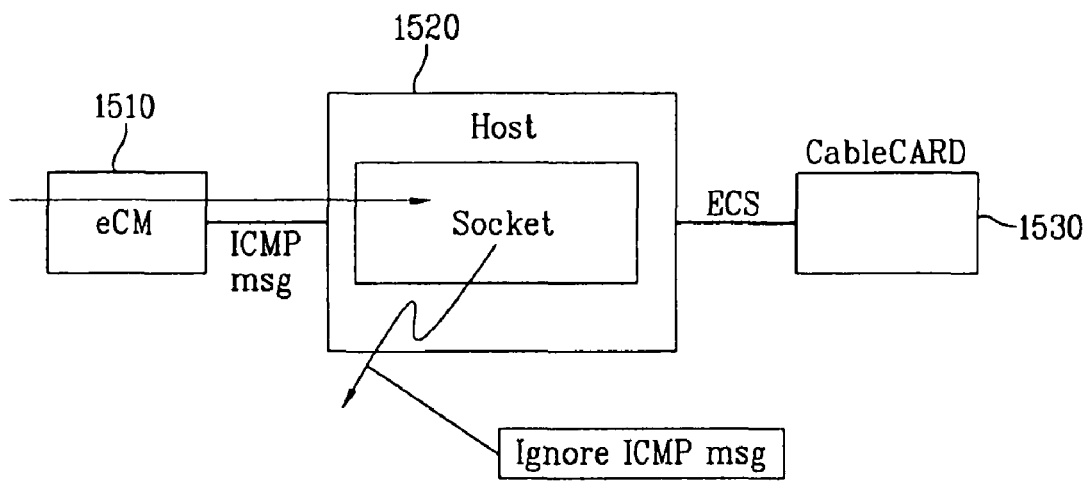
FIG. 15 illustrates a characteristic of processing an error message received by a host according to the present invention.

FIG. 15 illustrates a characteristic of processing an error message received by a host according to the present invention.

Referring to FIG. 15, in a broadcasting receiver including a cable modem 1510, a host 1520, and a CABLECARD 1530, if the host 1520 receives an error message through the cable modem 1510, the host 1520 ignores the error message.

Figure 16:
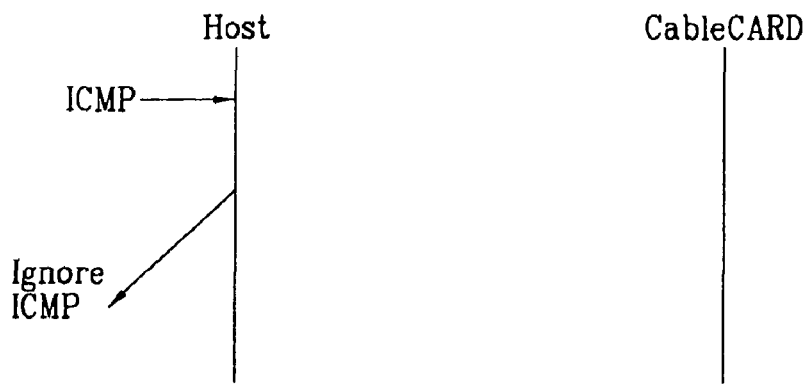
FIG. 16 illustrates an error message ignoring flow by a host according to the present invention.

FIG. 16 illustrates an error message ignoring flow by a host according to the present invention.

If information indicating that the error message received by the host should be ignored is recorded in the error message control field, the host transmits a UDP datagram without confirming the state of the remote server when the UDP socket is requested to be opened. The host does not notify the CABLECARD of any message without considering whether transmitted data arrives at a designation.

When receiving an error message (ICMP message) representing that an error occurs in UDP packet transmission due to an error in the remote server or the middle router after transmitting the UDP datagram, the host ignores the error message and continues to transmit data.

Figure 17:
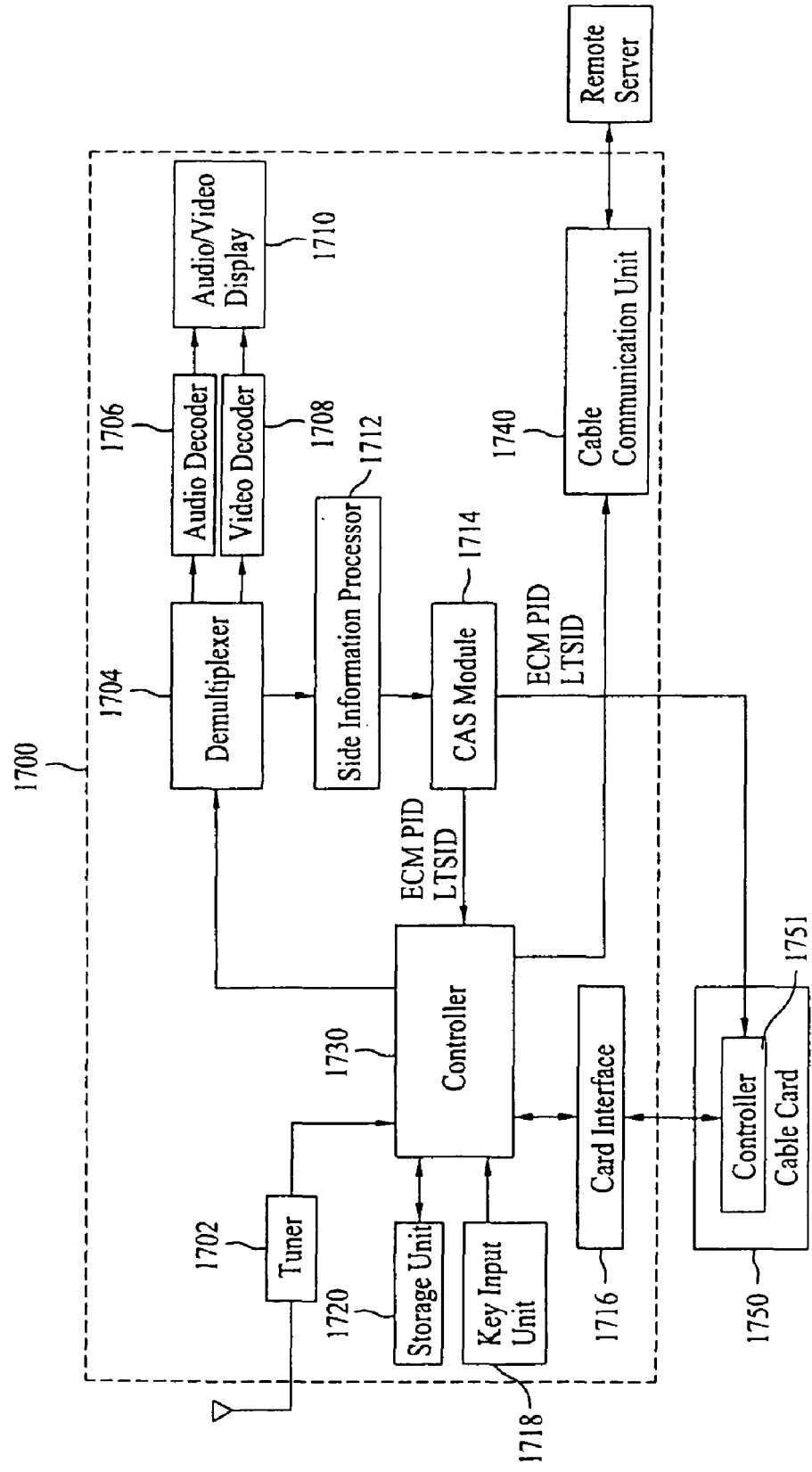
FIG. 17 is a block diagram of a broadcasting receiver according to an exemplary embodiment of the present invention.

FIG. 17 is a block diagram of a broadcasting receiver according to an exemplary embodiment of the present invention.

Referring to FIG. 17, the broadcasting receiver includes a CABLECARD which is a communication path with a broadcasting signal transmitter, a cable communication unit implementing network communication by connecting the broadcasting receiver to a remote server, and a host which receives data from the CABLECARD and transmits and receives data with the remote server through the cable communication unit.

The CABLECARD and the host are connected by a new flow request message new_flow_req( ) including a control field for recording processing information on a communication error. The host or the CABLECARD processes the error according to the processing information recorded in the control field.

For example, the new flow request message new_flow_req( ) may be a message for requesting a data transmitting and receiving path for TCP communication to be connected. Then the processing information may be information on a control subject of a timeout generated due to a packet transmission delay during TCP communication and the control subject may be the host or the CABLECARD.

Alternatively, the new flow request message new_flow_req( ) may be a message for requesting the data transmitting and receiving path for UDP communication to be connected. Then the processing information may be processing method information of an error message generated during UDP communication. The processing method information may indicate that the host should ignore the error message or that the host should cope with the error message. Alternatively, the processing method information may indicate that the host should report the error message to the CABLECARD.

The digital broadcasting receiver includes a host 1700, a cable communication unit 1740, and a CABLECARD 1750.

The host 1700 includes a tuner 1702, a demultiplexer 1704, an audio decoder 1706, a video decoder 1708, an audio/video display 1710, a side information processor 1712, a conditional access system (CAS) module 1714, a key input unit 1718, a card interface 1716, a storage unit 1720, and a controller 1730.

The tuner 1702 selects a broadcasting channel selected by a user. If the user changes a broadcasting channel, a corresponding frequency is selected. The selected frequency is inputted to a vestigial sideband (VSB) or quadrature amplitude modulation (QAM) converter (not shown) and converted into a digital signal.

The demultiplexer 1704 demultiplexes a time-multiplexed transport stream. That is, the demultiplexer 1704 separates the time-multiplexed transport stream into video, audio, and side information signals.

The audio decoder 1706 extends/restores the audio signal separated from the demultiplexer 1704 so as to output the audio signal through the audio/video display 1710. The video decoder 1708 extends/restores the video signal separated from the demultiplexer 1704 so as to output the video signal through the audio/video display 1710.

The CAS module 1714 extracts entitlement control message packet identification (ECM PID) and local transport stream identification (LTSID) from information analyzed by the side information processor 1712.

The key input unit 1718 receives commands inputted by a user, and the controller 1730 controls an operation of each part of the digital broadcasting receiver.

The controller 1730 carries out reproducing restriction processing for limiting a receiving function between the CABLECARD 1750 and the host 1700. The controller 1730 classifies a received digital broadcasting signal into a main stream and an extra stream to judge whether the streams are scrambled and descrambles the scrambled stream.

The controller 1730 controls a socket process between the host and the CABLECARD. That is, the controller 1730 receives a new flow request message from the CABLECARD and analyzes a control field value. If an error occurs during communication, the controller 1730 processes the error according to processing information recorded in the control field. The above-described socket process may be applicable to the controller 1730.

For example, in the case where a timeout error occurs during TCP communication, if the control field value is information indicating that the host is a subject of control, the controller 1730 controls error processing. If the control field value is information indicating that the subject of control is the CABLECARD, the controller 1730 ignores processing for the case where an acknowledgement message for the transmitted data packet is not received and attempts re-transmitting data until a response message is received.

As another example, if an error message for data transmission during UDP communication is received, the controller 1730 controls error processing according to the control field value.

The storage unit 1720 stores and extracts necessary information according to a control signal of the controller 1730. In the exemplary embodiment of the present invention, stream information obtained by determining whether the stream is scrambled is stored in the storage unit 1720 by the control signal of the controller 1730.

The CABLECARD 1750 is inserted into the card interface 1716. The card interface 1716 may be located at the interior of the host 1700, at the CABLECARD 1750, or at both the interior of the host 1700 and the CABLECARD 1750. The cable interface 1716 becomes a communication path when the controller 1730 transmits and receives a message with the CABLECARD 1750.

The cable communication unit 1740 performs network communication. The cable communication unit 1740 is connected to the remote server to transmit and receive messages. As an example of the cable communication unit 1740, there is a cable modem.

The CABLECARD 1750 is a communication path with a broadcasting signal transmitter. The CABLECARD 1750 includes a controller 1751 therein.

If the timeout error occurs during TCP communication, the controller 1751 controls error processing after timeout when the control field value indicates that the CABLECARD is the subject of control.

When the processing method information recorded in the control field indicates that an error message should be reported to the CABLECARD, if the host reports reception of the error message during UDP communication to the CABLECARD 1750, the controller 1751 determines a next procedure. That is, the CABLECARD 1750 becomes a subject for error processing.

In the exemplary embodiment of the present invention, a descrambling module is included in the CABLECARD and the CABLECARD is attached and detached to and from the host. A broadcasting signal from a broadcasting station is descrambled through the descrambling module of the CABLECARD and provided to users. However, the descrambling module may be included in the host without the CABLECARD and the descrambling module may be downloaded from the broadcasting station. Namely, the descrambling module downloaded from the broadcasting station may be stored in a memory in the host.

An example of downloading the descrambling module is to automatically download a conditional access image from a head-end when a security processor previously installed in a set-top is connected to a network. However, it is apparent that a difference in such a configuration does not vary the scope of the invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A data transmitting and receiving method in a broadcast receiver, the method comprising:
   transmitting, by a CABLECARD to a host, a new flow request message including a timeout control field for recording control subject information on a subject of timeout control during communication;
   receiving by the CABLECARD a new flow response message from the host confirming the new flow request message;
   transmitting data from the CABLECARD to the host connected to the CABLECARD by a socket process;
   forwarding the data received from the CABLECARD to a remote server;
   generating in the CABLECARD, a timeout when no response is received for a given time after the CABLECARD transmits the data; and
   processing the timeout error by the CABLECARD according to the control subject information, wherein the information indicates that the subject of time control is the CABLECARD.

2. The data transmitting and receiving method according to claim 1, wherein the timeout is generated when a response message to the transmitted data is not received for a given time after the CABLECARD transmits data to the host.

3. The data transmitting and receiving method according to claim 1, further comprising:
   stopping transmitting data to the host by the CABLECARD when the timeout is generated and transmitting a flow close request message to the host; and
   closing a socket process by the host.

4. A data transmitting and receiving method in a broadcast receiver, the method comprising:
   receiving, by a host, a new flow request message including an error message control field for recording processing method information of an error message received during UDP communication indicating timeout control related to data communication and
   the host transmits a new flow response message to a CABLECARD confirming the new flow request message;
   receiving data from the CABLECARD by the host connected to the CABLECARD by a socket process;
   transmitting the data received from the CABLECARD to a remote server;
   generating in the CABLECARD, a timeout when no response is received for a given time and
   receiving an error message for the transmitted data by the host; and
   processing the received error message by the host according to the information recorded in the error message control field,
   wherein the error message includes the timeout by the host when the control subject information indicates that the subject of the time control is the host.

5. The data transmitting and receiving method according to claim 4, wherein the host ignores the received error message when the processing method information indicates that the received error message should be ignored.

6. The data transmitting and receiving method according to claim 4, further comprising:
   transmitting an error occurrence indication message by the host to the CABLECARD when the processing method information indicates that the received error message should be processed;
   stopping transmitting data to the host by the CABLECARD and transmitting a flow close request message to the host; and
   closing a socket process by the host.

7. The data transmitting and receiving method according to claim 6, wherein the error occurrence indication message includes a reason field for recording reception information of the error message.

8. The data transmitting and receiving method according to claim 4, further comprising;
   reporting error occurrence of data to the CABLECARD by the host when the processing method information indicates that the received error message should be reported to the CABLECARD; and
   determining whether to transmit data by the CABLECARD and informing the host of a determined result.

9. A broadcasting receiver comprising:
   a CABLECARD which is a communication path with a broadcasting signal transmitter;
   a cable communication unit performing network communication by connecting the broadcasting receiver to a remote server; and
   a host which receives data from the CABLECARD by a socket process and
   transmits and receives data with the remote server through the cable communication unit;
   wherein the host receives a new flow request message including an error message control field for recording processing method information of an error message received during communication indicating timeout control related to data communication and
   the host transmits a new flow response message to the CABLECARD confirming the new flow request message;
   the CABLECARD transmitting data to the host;
   the host forwarding the data to the remote server;
   the CABLECARD generating a timeout when no response is received for a given time after transmitting data to the host, and the host receiving an error message for the transmitted data; and the host processing the received error message according to the information recorded in the error message control field, the error message including the timeout by the host when the control subject information indicates that the subject of the time control is the host.

10. The broadcasting receiver according to claim 9, wherein the new flow request message requests a connection of a data transmitting and receiving path for TCP communication.

11. The broadcasting receiver according to claim 10, wherein the processing information is information on a control subject of a timeout generated by a packet transmission delay during the TCP communication.

12. The broadcasting receiver according to claim 11, wherein the control subject is the host or the CABLECARD.

13. The broadcasting receiver of claim 9, wherein the new flow request message requests a connection of a data transmitting and receiving path for UDP communication.

14. The broadcasting receiver according to claim 13, wherein the processing information is information on an error message processing method received by the error occurrence during UDP communication.

15. The broadcasting receiver according to claim 14, wherein the processing method information is information indicating that the host should ignore the error message or that the host should process the error message.

16. The broadcasting receiver according to claim 14, wherein the processing method information indicates that the host should report the error message to the CABLECARD.

* * * * *